United States Patent Office 2,754,277
Patented July 10, 1956

2,754,277

TALL OIL ESTERIFIED WITH MIXTURE OF EPOXY RESIN AND POLYHYDRIC ALCOHOL USED AS INK VEHICLE

John W. McNabb, Cedarhurst, N. Y., assignor of one-half to American Can Company, New York, N. Y., a corporation of New Jersey, and one-half to Kienle & Company, Brooklyn, N. Y., a corporation of New York No Drawing. Application December 3, 1951, Serial No. 259,735

1 Claim. (Cl. 260—18)

This invention relates to a composition that is useful as a lithographic ink vehicle, and the like, and refers more particularly to a lithographic ink vehicle comprising a drying oil blended or heated with a mixed or compound ester of tall oil formed by esterifying tall oil with a low molecular weight aliphatic polyhydric alcohol and a resinous high molecular weight polyalcohol which in turn is formed by the reaction of polyphenols and aliphatic epoxy compounds.

An object of the invention is the provision of a lithographic ink vehicle containing a mixed or compound ester of tall oil and a drying oil as a film forming ingredient.

Another object is the provision of a film forming ink vehicle by esterifying non-drying oil acids with a mixture of (1) a resinous polyalcohol having recurring aromatic nuclei connected by aliphatic chains bearing hydroxyl and epoxy groups, and (2) a low molecular weight aliphatic polyalcohol, and blending or heating the mixed ester with a drying oil.

Still another object is the provision of an ink vehicle made by blending or heating a drying oil with a compound tall oil ester formed by reacting the tall oil with a mixture of alcohols at least one of which is a low molecular weight aliphatic polyhydric alcohol, and the other a resinous polyhydric alcohol formed by the reaction of a polyhydroxy phenol with an aliphatic epoxy compound.

Numerous other objects and advantages of the invention will be apparent as it is better understood from the following description which is of a preferred embodiment thereof.

Lithographic ink vehicles are composed of water repelling materials that possess the characteristic of being film formers, or potential film formers, when baked for a period of from a few minutes to about a half hour at temperatures of 300°–400° F., whereby a hard, tough, flexible coat results on a printed medium. These vehicles usually consist of a drying oil base, and they may have an oil soluble resinous material incorporated therein.

Tall oil is a by-product of paper pulp manufacture and contains, as its main ingredients, a high proportion of non-drying oil acids, resins and resin acids. It is fluid at room temperature and, because of its very low degree of unsaturation, does not body appreciably when heated in the presence of oxygen. Tall oil lacks the drying or film forming characteristics necessary for an ink vehicle. For this reason there has been little commercial application of the oil in lithography.

Attempts have been made to blend drying oils with glycerol, glycol and pentaerythritol esters of tall oil to form a mixture that would dry on heating. The very poor drying characteristics of such tall oil esters made it very difficult to produce a film that was not excessively tacky after baking.

Varnishes can be prepared by esterifying tall oil with a resinous polyalcohol formed by reacting a polyhydroxy phenol with an epihalohydrin and blending the resultant ester with a drying oil, as described in Greenlee Patent 2,493,486, issued January 3, 1950.

I have discovered that tall oil can be used as a major ingredient in a lithographic ink vehicle, to produce compositions having unexpected and improved qualities which are superior in many respects to those of vehicles formulated entirely from bodied drying oils or drying oils and oil soluble resins. These results are accomplished by chemically combining the tall oil with low molecular weight aliphatic polyhydric alcohols and high molecular weight resinous polyalcohols formed by reacting polyhydroxy phenols with aliphatic epoxy compounds. By this reaction a mixed or compound ester of tall oil, having excellent drying characteristics, is formed. The mixed or compound ester is distinguished from a mixture of two esters, namely, (1) a tall oil ester of a low molecular weight aliphatic polyhydric alcohol and (2) a tall oil ester of a resinous polyol formed by reacting a polyhydroxy phenol and an epihalohydrin, in that a mixture of these two esters has a limited use as an ink vehicle because of the poor drying properties of the tall oil ester of the low molecular weight polyhydric alcohol.

The term polyhydroxy phenol is intended to relate to phenols having more than one hydroxyl group in the molecule. It includes mononuclear polyphenols, such as for example, the resorcinols, phloroglucinol, catechol, and hydroquinone and polynuclear phenols such as the polyhydroxy naphthols, the bis-phenols of methane, ethane, propane and butane, and di-hydroxy benzophenones.

The resinous high molecular weight polyhydric alcohols may be formed in accordance with the following exemplary reaction:

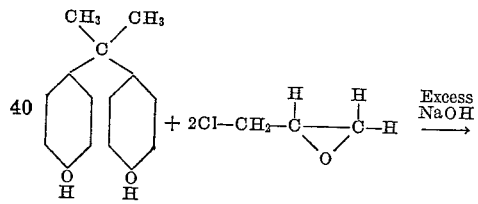

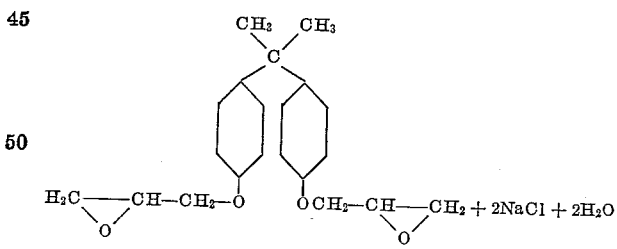

Bis-(4-hydroxyphenol)-2,2 propane (known in the trade as bisphenol A and so designated in the examples) and epichlorohydrin are reacted to form an epoxy ether derivative of the bisphenol. The latter compound is polymerized by heat under alkaline conditions to produce a resinous material having a multiplicity of hydroxyl groups. Resinification can be effected without isolating the monomer, by maintaining the alkaline concentration at a catalytic level and heating the mixture. The resin is composed of a series of alternating aromatic nuclei substantially free of unreacted hydroxyl groups connected to alternate aliphatic chains through ether linkages. Each aliphatic chain contains at least one hydroxyl or epoxy group as the sole reactive group in the chain. The resinous polyol can be represented by the following formula:

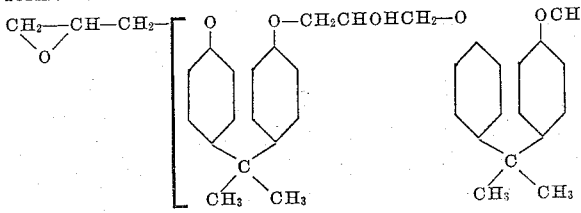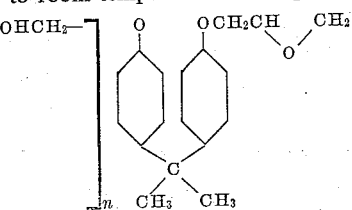

in which $n$ is an integer greater than 1.

In place of epichlorohydrin, dichlorohydrin, propylene chlorohydrin, or other halohydrins, butylene dioxide and other polyepoxy compounds can be substituted.

The molecular weights of the resinous polyalcohols that are useful can vary from about 1,000 to 4,000.

The low molecular weight aliphatic polyhydric alcohols embrace such compounds as glycerol, pentaerythritol, erythritol, and glycols having from 2 to 4 carbon atoms in which each carbon is bonded directly to an adjacent carbon atom. These monomeric polyhydric alcohols can be used individually or in any combination.

In preparing the lithographic ink vehicles of my invention, I first prepare the mixed or compound ester of the tall oil and then blend or heat body a drying oil with the compound ester and permit the entire mass to cool gradually. The examples indicate the method of preparing my lithographic ink vehicles. The ingredients in all cases are used in parts by weight.

Example I

| Ingredient: | Parts by weight |
| --- | --- |
| Tall oil | 49.5 |
| Resinous polyol of bisphenol A and epichlorohydrin, mol. wt. about 2500 | 5.65 |
| Pentaerythritol | 6.5 |
| Chinawood oil | 39.45 |

The tall oil, the resinous polyol and 5.4 parts of pentaerythritol were placed in a four necked flask equipped with a motor driven agitator, a thermometer, an inert gas inlet and a condenser connected to a Stark and Dean apparatus for removing water of esterification as the reaction proceeded. The ingredients were heated under a blanket of nitrogen, or other inert gas, to a temperature of 280° C. in approximately three hours. The acid number at this point was 23. About 1.1 additional parts of pentaerythritol were added and the temperature raised to about 300° C. in about one hour. The mixed ester was then permitted to cool to about 200° C. and the chinawood oil was added, after which the product was cooled slowly to room temperature. The finished vehicle had an acid number of 5.5, a Gardner (1933) color of 10 and a viscosity (Gardner) of Z–4 to Z–5. The equipment for the subsequent examples was the same as that described, unless otherwise specified, and all samples were heated in an atmosphere of inert gas, except those in which another method is specifically indicated.

Example II

| Ingredient: | Parts by weight |
| --- | --- |
| Tall oil | 49.5 |
| Resinous polyol of bisphenol A and epichlorohydrin, mol. wt. about 1500 | 10.42 |
| Pentaerythritol | 5.52 |
| Chinawood oil | 35.75 |

The tall oil and resinous polyol were heated to 270° C. in 45 minutes and held at that temperature for 40 minutes. About 4.32 parts of pentaerythritol were added and the temperature was maintained between 240–250° C. for about 1½ hours. The acid number at this point was 27.3. An additional 1.2 parts of pentaerythritol were added and the temperature was held at 240°–250° C. for about an additional 1½ hours. The chinawood oil was then added and the mixture was allowed to cool to room temperature. The product had an acid number of 13.5, a Gardner (1933) color of 10.5 and a Gardner viscosity of Z–6.

Example III

| Ingredient: | Parts by weight |
| --- | --- |
| Tall oil | 49.5 |
| Maleic anhydride | 0.98 |
| Resinous polyol of bisphenol A and epichlorohydrin, mol. wt. about 2500 | 5.63 |
| Pentaerythritol | 8.4 |
| Chinawood oil | 36.69 |

The tall oil and maleic anhydride were heated to about 220° C. in 40 minutes and held between 220°–230° C. for another 40 minutes. The resinous polyol was added and the temperature was raised to 270° C. in 15 minutes, and held for 35 minutes. About 7.2 parts of pentaerythritol were added and the ingredients were permitted to react at 250° C. for two hours. The acid number was 42.6. Another 1.2 parts of pentaerythritol were added and the temperature was raised to 260° C. and maintained for 45 minutes. The chinawood oil was added to the mixed ester of tall oil and the product was permitted to cool to room temperature slowly. The finished ink vehicle had an acid number of 19.3, a Gardner (1933) color of 11.5 and a Gardner viscosity between Z–5 and Z–6.

Example IV

| Ingredient: | Parts by weight |
| --- | --- |
| Tall oil | 82.5 |
| Resinous polyol of bisphenol A and epichlorohydrin, mol. wt. about 2500 | 7.52 |
| Pentaerythritol | 11.38 |

The tall oil, resinous polyol and 8.75 parts of pentaerythritol were heated to 290° C. in three hours. Another 1.23 parts of pentaerythritol were added and the mixture allowed to react for 45 minutes at a temperature between 290°–300° C. The acid number then was 25.0. An additional 1.4 parts of pentaerythritol were added and allowed to react at 290°–300° C. for another hour, after which the product was permitted to cool to room temperature. The finished material had an acid number of 12.7, a Gardner (1933) color of 11.5 and a Gardner viscosity that was too high for use as a lithographic ink vehicle, but it could readily be blended with drying oils to be effective for such purpose.

Example V

| Ingredient: | Parts by weight |
| --- | --- |
| Tall oil | 49.5 |
| Resinous polyol of bisphenol A and epichlorohydrin mol. wt. about 2500 | 5.65 |
| Pentaerythritol | 6.2 |
| Dehydrated castor oil | 39.45 |

The tall oil, resinous polyol and 5.4 parts of pentaerythritol were heated to 285°–295° C. in about 2½ hours and held at that temperature for about one hour. The acid number was 20.9. Another 0.8 part of pentaerythritol were added and the reaction temperature was held at 290°–300° C. for 40 minutes. The dehydrated castor oil was then incorporated and the mixture was permitted to cool to room temperature slowly. The acid number was 8.2, the Gardner (1933) color was 12 and the Gardner viscosity was between Z–2 and Z–3.

*Example VI*

| Ingredient: | Parts by weight |
|---|---|
| Tall oil | 24.8 |
| Resinous polyol of bisphenol A and epichlorohydrin mol. wt. about 2500 | 9.4 |
| Pentaerythritol | 3.6 |
| Chinawood oil | 64.0 |

The tall oil, resinous polyol and 1.8 parts of pentaerythritol were heated to 300° C. in about 1 hour. Another 1.8 parts of pentaerythritol were added and the reaction temperature was held at 290°–300° C. for about an hour. At this point the acid number was 11.1. The chinawood oil was added and the product was allowed to cool slowly to room temperature. The vehicle had an acid number of 7.5, a Gardner (1933) color of 10 and a Gardner viscosity of Z.

*Example VII*

| Ingredient: | Parts by weight |
|---|---|
| Tall oil | 33.00 |
| Resinous polyol of bisphenol A and epichlorohydrin, mol. wt. about 2500 | 13.15 |
| Pentaerythritol | 2.16 |
| Chinawood oil | 51.69 |

The tall oil, resinous polyol and pentaerythritol were heated to 295° C. in 45 minutes. The temperature was maintained for another hour and 35 minutes. The acid number was 10.3. The chinawood oil was added and the product allowed to cool to room temperature slowly. The vehicle had an acid number of 9.9, a Gardner (1933) color of 10.5 and a Gardner viscosity slightly greater than Z–6.

*Example VIII*

| Ingredient: | Parts by weight |
|---|---|
| Tall oil | 24.8 |
| Resinous polyol of bisphenol A and epichlorohydrin, mol. wt. about 2500 | 13,15 |
| Pentaerythritol | 1.8 |
| Chinawood oil | 60.25 |

The tall oil and resinous polyol were heated to 300° C. in about an hour and permitted to react between 290° and 300° C. for 45 minutes. The pentaerythritol was added and the temperature was maintained between 290° and 300° C. for another 45 minutes. The acid number at this point was 11.4. Chinawood oil was then added and the product was allowed to cool to room temperature slowly. The vehicle had an acid number of 9.1, a Gardner (1933) color of 10.5 and a Gardner viscosity slightly greater than Z–5.

*Example IX*

| Ingredient: | Parts by weight |
|---|---|
| Tall oil | 49.5 |
| Resinous polyol of bisphenol A and epichlorohydrin, mol. wt. about 2500 | 5.65 |
| Pentaerythritol | 6.6 |
| Oiticica oil | 39.45 |

The tall oil, resinous polyol and about 5.4 parts of pentaerythritol were heated to about 300° C. in about 2¼ hours. The acid number at this point was 30.0. Another 1.2 parts of pentaerythritol were added and the reaction temperature was maintained at 290°–300° C. for another 30 minutes. The oiticica oil was then added and the product was allowed to cool to room temperature slowly. This vehicle had an acid number of 10.5, a Gardner (1933) color of 9.5 and a Gardner viscosity slightly greater than Z–6.

*Example X*

| Ingredient: | Parts by weight |
|---|---|
| Tall oil | 49.5 |
| Resinous polyol of bisphenol A and epichlorohydrin, mol. wt. about 2500 | 5.65 |
| Pentaerythritol | 6.4 |
| Chinawood oil | 39.45 |

The tall oil, resinous polyol and 5.4 parts of pentaerythritol were placed in an open kettle equipped with a hand paddle for agitation and with a stream of inert gas bubbling through the reaction mixture. The temperature of the ingredients was raised to 300° C. in 1 hour and forty minutes and held there for thirty minutes. The acid number of the product was 23.4. Another part of pentaerythritol was added and reacted at 290°–300° C. for about 20 minutes. The chinawood oil was then added and the product was allowed to cool to room temperature slowly. The vehicle had an acid number of 7.7, a Gardner (1933) color of 16 and a Gardner viscosity between Z–4 and Z–5.

*Example XI*

| Ingredient: | Parts by weight |
|---|---|
| Tall oil | 49.5 |
| Resinous polyol of bisphenol A and epichlorohydrin, mol. wt. about 2500 | 5.65 |
| Pentaerythritol | 6.6 |
| Chinawood oil | 39.45 |

The tall oil, resinous polyol and 5.4 parts of pentaerythritol were placed in a stainless steel kettle equipped with a variable speed turbine type agitator, a thermocouple, a condenser system with a water trap, an inert gas inlet and an electrical heating unit. The agitator was set at 300 R. P. M. throughout the cooking procedure. The temperature was slowly raised to about 300° C. and held for about 1½ hours. The acid number at this point was 25.0. An additional 1.2 parts of pentaerythritol were added and the reaction temperature was held at about 275°–280° C. for 40 minutes. The product was then cooled to about 235° C. and the chinawood oil was added, thus causing a further temperature drop to about 160° C. The temperature was raised to about 180°–185° C. for thirty minutes and then the product was poured from the kettle and permitted to cool slowly to room temperature. This vehicle had an acid number of 6.8, a Gardner (1933) color of 9.5 and a Gardner viscosity of Z–4.

Lithographic ink vehicles can also be prepared by forming a mixed ester of the resinous polyalcohols and monomeric low molecular weight alcohols and a tall oil blended with acids from semi-drying oils.

*Example XII*

| Ingredient: | Parts by weight |
|---|---|
| Tall oil | 41.25 |
| Soya bean oil fatty acids | 21.00 |
| Resinous polyol of bisphenol A and epichlorohydrin, mol. wt. about 1500 | 13.00 |
| Glycerol | 5.60 |
| Pentaerythritol | 1.30 |
| Chinawood oil | 19.15 |

The tall oil, soya bean oil fatty acids, resinous polyol and glycerol were heated to 250° C. in about 2¾ hours. The acid number at this point was 28.4. The pentaerythritol was added and the reaction temperature of 240°–250° C. was maintained for about 2¾ hours. Then the chinawood oil was added and the product allowed to cool slowly to room temperature. The vehicle had an acid number of 5.1, a Gardner (1933) color of 12.5 and a Gardner viscosity of Z–5.

Example XIII

| Ingredient: | Parts by weight |
|---|---|
| Tall oil | 49.5 |
| Resinous polyalcohol of bisphenol A and epichlorohydrin, mol. wt. 2500 | 5.65 |
| Ethylene glycol | 5.35 |
| Chinawood oil | 39.45 |

The tall oil, resinous polyalcohol and 4.65 parts of ethylene glycol were heated to 210° C. in 45 minutes and held at about 200° C. for 90 minutes. The temperature was then raised to 280° C. in 35 minutes and held between 280° and 290° C. for 65 minutes. The acid number at this stage was 21.0. About 0.7 more parts of ethylene glycol were added and the temperature was maintained between 280°–290° C. for 45 minutes. On addition of the chinawood oil the temperature dropped to 220° C. and was held at that point for 5 minutes after which the vehicle was permitted to cool slowly to room temperature. This composition had an acid number of 10.9, a Gardner (1933) color of 9.0 and a Gardner viscosity of X–Y.

Example XIV

| Ingredient: | Parts by weight |
|---|---|
| Tall oil | 49.5 |
| Resinous polyalcohol of bisphenol A and epichlorohydrin, mol. wt. about 2500 | 5.65 |
| Glycerol | 5.41 |
| Chinawood oil | 39.45 |

The tall oil, resinous polyalcohol and 4.8 parts of glycerol were heated to 230° C. in 65 minutes and held between 230° and 235° C. for 35 minutes. The temperature was raised to 285° C. in 30 minutes and held there for 60 minutes. The acid number at this point was 18.5. Additional glycerol, 0.61 part, was added and the temperature was maintained for 45 minutes. Upon addition of the chinawood oil the temperature dropped to 220° C. where it was held for 5 minutes before cooling slowly to room temperature. The final product had an acid number of 11.7 a Gardner (1933) color of 10.0 and a Gardner viscosity of Z–1—Z–2.

Example XV

| Ingredient: | Parts by weight |
|---|---|
| Tall oil | 49.5 |
| Resinous polyalcohol of bisphenol A and epichlorohydrin, mol. wt. about 3000 | 6.0 |
| Pentaerythritol | 5.4 |

A mixed ester was made by heating tall oil, the resinous polyalcohol described and pentaerythritol to 290° C. in one hour and allowing the reaction to proceed for 1½ hours at 285°–295° C. At the end of this period the product was cooled slowly to room temperature. The mixed ester was a very viscous liquid with an acid number of 15.4. Forty parts of chinawood oil were added and the mixture was bodied at 210° C. for 5 minutes. The finished vehicle had an acid number of 10.9, a Gardner (1933) color of 10.5 and a Gardner viscosity of Z–4—Z–5.

Example XVI

| Ingredient: | Parts by weight |
|---|---|
| Tall oil | 49.5 |
| Resinous polyalcohol of bisphenol A and epichlorohydrin, mol. wt. about 2500 | 5.65 |
| Pentaerythritol | 8.68 |
| Chinawood oil | 26.00 |

The tall oil, resinous polyalcohol and 5.4 parts of pentaerythritol were heated to 285° C. in 90 minutes and the temperature was maintained between 285 and 295° C. for 40 minutes. The acid number at this point was 33.6. Another 3.28 parts of pentaerythritol were added and reacted at 290°–295° C. for 50 minutes. The mixture was cooled to 235° C. before addition of the chinawood oil. After all ingredients were blended the temperature was adjusted to 220° C. and held there for about 5 minutes for thorough mixing and bodying, prior to cooling slowly to room temperature. The vehicle had an acid number of 9.1, a Gardner (1933) color of 10.5 and a Gardner viscosity of Z–5—Z–6.

In addition to the drying oils specifically disclosed in the above formulations, other drying oils such for example as linseed oil, and perilla oil can be substituted or they may be used in any combination.

Other resinous polyols that can be substituted are those formed by reacting polyhydric phenols with epoxy containing compounds. The polyhydric phenols include catechol, phloroglucinol, resorcinol, hydroquinone, dihydroxynaphthols and bis-phenols of methane, ethane, propane and butane, and the dihydroxy benzophenones. These can be substituted in whole or in part for the bisphenol A and they can be used in any combination.

In addition to epihalohydrin, resinous polyols can be formed by reacting the polyphenols with other halogenated compounds having from 3 to 5 carbon atoms in which at least one halogen is attached to a terminal carbon and having one or more epoxy groups at least one of which is in a terminal position, and halogen free compounds having more than one epoxy group, at least one of which is a terminal epoxy group.

For preparing the mixed ester the percentage by weight based on the unreacted ester forming materials can vary from about 62 to 84 per cent of tall oil, from about 8 to 34 per cent of resinous polyalcohol and from about 4 to 15 per cent of the aliphatic polyhydric alcohol.

The drying oil in the finished vehicle is present in amounts of from about 19 to about 65 per cent by weight of the finished product. The total amount of resinous polyalcohol is small and is in the range of from about 5.0 to about 13.5 per cent by weight of the vehicle.

Among the improved results from the use of the mixed ester and drying oil as a lithographic ink vehicle are:

1. Excellent drying qualities of the vehicle even though the amount of resinous polyol is as low as 5 per cent of the vehicle.
2. Exceptional pigment wetting characteristics, and as an incidental effect, greater color strength, so that smaller amounts of ink are required on a given substrate to produce a desired color; or
3. Greatly improved flow properties which result in a more uniform leveling of applied ink and a higher order of gloss after the ink is baked.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

I claim:

A lithographic ink vehicle comprising about 39 to 40 per cent by weight based on the vehicle of chinawood oil, and about 60 to 61 per cent of a mixed ester of tall oil, said tall oil being esterified with a mixture of alcohols consisting of (1) a resinous polyalcohol resulting from the reaction of bis-(4 hydroxy-phenyl) 2,2 propane and an epihalohydrin, said resinous polyalcohol having a molecular weight of about 2,500 and being present in a concentration of about 9 per cent by weight based on unreacted ester forming materials and (2) about 10.7 per cent by weight of pentaerythritol.

References Cited in the file of this patent

UNITED STATES PATENTS

| | | |
|---|---|---|
| 2,493,486 | Greenlee | Jan. 3, 1950 |
| 2,504,518 | Greenlee | Apr. 18, 1950 |
| 2,627,483 | Dowd | Feb. 3, 1953 |

OTHER REFERENCES

Shell Chemical Company, Epon Surface Coating Resins, 1948, page 12 and 13.